Patented Apr. 14, 1942

2,279,725

UNITED STATES PATENT OFFICE 2,279,725

VAT DYESTUFF OF THE DIBENZANTHRONE SERIES AND PROCESS OF MAKING SAME

Hugo Wolff, Mannheim, Emil Krauch, Neckargemuend, and Karl Wilke, Frankfort-on-the-Main-Hochst, Germany, assignors to General Aniline & Film Corporation, a corporation of Delaware No Drawing. Application June 28, 1939, Serial No. 281,662. In Germany July 13, 1938

3 Claims. (Cl. 260—354)

The present invention relates to vat dyestuffs of the dibenzanthrone series and a process of producing same.

We have found that valuable grey to black vat dyestuffs can be obtained by treating 2,2'-dibenzanthronyl with a nitrating agent until two nitro groups are introduced into the 2,2'-dibenzanthronyl, reducing the dinitro compound thus obtained to the corresponding diamino-2,2'-dibenzanthronyl and fusing the latter with an alkali metal hydroxide at between 190 to 205° C. in the presence of an alcohol having less than 3 carbon atoms.

The nitration of the 2,2'-dibenzanthronyl is preferably carried out in concentrated sulphuric acid with such amounts of nitric acid that two nitro groups are introduced into the molecule. The reduction of the dinitro-2,2'-dibenzanthronyl is effected by means of a reducing agent for instance sodium sulfide which is employed in such amounts that both nitro groups of the dinitro compound are reduced to amino groups.

The fusion of the diamino-2,2'-dibenzanthronyl with caustic alkalies is effected at between 190° and 205° C. with an addition of an alcohol having less than 3 carbon atoms. Dyestuffs are thus obtained which dye cotton from grey to black shades of good fastness properties. A special advantage of the dyestuffs is the good agreement of their shade of color in dyeings and prints and the excellent fastness to water, whereby the shade of color is scarcely changed. The properties of the dyestuffs differ somewhat according to the alcohols used in the alkali fusion; especially beautiful shades of color are obtained by using methanol. In the dyestuffs, apparently only a part of the nitrogen is still present in the form of diazotizable amino groups.

The following examples will further illustrate how this invention may be carried out in practice, but the invention is not restricted to these examples. The parts are by weight.

Example 1

A mixture of 6.4 parts of concentrated sulfuric acid and 6.8 parts of concentrated nitric acid is introduced while stirring and at a temperature from 5 to 10° C. in the course of one hour into a solution of 24 parts of 2,2'-dibenzanthronyl in 240 parts of concentrated sulfuric acid. The whole is stirred at the said temperature until nitric acid is no longer detectable. The reaction mixture is then poured into ice-water, the deposited compound filtered off by suction and washed until free from acid.

The wet filter cake (containing the dinitro-2,2'-dibenzanthronyl, a greenish yellow compound, which dissolves in concentrated sulfuric acid to give a yellow-orange coloration and which has a nitrogen content of 4.92 per cent) is suspended in such amounts of water as to give a total amount of 488 parts. 68 parts of crystallized sodium sulfide and 6.8 parts of a 35 per cent sodium hydroxide solution are then added and the whole is heated while stirring within about one hour to from 95 to 97° C. and stirring is continued at this temperature until the greenish yellow needles of the dinitro-2,2'-dibenzanthronyl have disappeared and only brown needles of the diamino-2,2'-dibenzanthronyl formed are detectable (about one hour). The whole is then diluted with 280 parts of hot water, the reaction product filtered off by suction at from 80 to 85° C., washed with hot water until neutral and dried. The diamino-2,2'-dibenzanthronyl thus obtained is a brown compound which dissolves in concentrated sulfuric acid giving an orange coloration without any fluorescence.

20 parts of the diamino-2,2'-dibenzanthronyl thus obtained are introduced in the course of about half an hour into a mixture of 130 parts of potassium hydroxide and 70 parts of ethanol while stirring at from 200° C. to 205° C., the whole being stirred at the said temperature until the amount of dyestuff formed no longer increases. After cooling, the melt is then boiled up in the usual way with water with access of air and the deposited dyestuff is recovered by filtration. It dissolves in sulphuric acid giving a violet coloration and dyes cotton from a violet vat grey shades of good fastness properties to water and good agreement in dyeing and print.

Example 2

From a mixture of 260 parts of potassium hydroxide and 160 parts of methanol, methanol is distilled off until a temperature of 195° C. has been reached. In the course of half an hour at from 195° to 200° C. there are then introduced into the mixture while stirring 40 parts of diamino-2,2'-dibenzanthronyl (prepared as described in Example 1) the whole being then stirred at from 200° to 205° C. until the formation of dyestuff is completed. After cooling, the melt is boiled up with water.

The dyestuff obtained gives grey dyeings which are distinguished by a beautiful bluish shade, in particular also in artificial light, and which also have an excellent fastness to drops of water.

What we claim is:

1. A process of producing from grey to black vat dyestuffs of the dibenzanthrone series which comprises treating 2,2'-dibenzanthronyl dissolved in a concentrated sulfuric acid with about 2 molecular proportions of nitric acid at low temperatures so as to introduce two nitro groups into the molecule, reducing the dinitro compound thus obtained to the corresponding diamino-2,2'-dibenzanthronyl and fusing the latter with alkali metal hydroxide at between 190° and 205° C. in the presence of an alcohol having less than 3 carbon atoms.

2. A process of producing from grey to black vat dyestuffs of the dibenzanthrone series which comprises treating 2,2'-dibenzanthronyl dissolved in a concentrated sulfuric acid with about 2 molecular proportions of nitric acid at low temperatures so as to introduce two nitro groups into the molecule, reducing the dinitro compound thus obtained to the corresponding diamino-2,2'-dibenzanthronyl and fusing the latter with alkali metal hydroxide at between 190° and 205° C. in the presence of methanol.

3. The vat dyestuff of the dibenzanthrone series obtained according to the process of claim 2 which dissolves in trichlorbenzene giving a blue-green coloration and exhibits absorption maxima at wave lengths of 500m$\mu$ and 580m$\mu$ and which dyes and prints vegetable fibres in the same shades of from grey to black, which dyeings and prints scarcely change their shades of color when exposed to water.

HUGO WOLFF.
EMIL KRAUCH.
KARL WILKE.